US011386659B2

(12) United States Patent
Kim et al.

(10) Patent No.: US 11,386,659 B2
(45) Date of Patent: Jul. 12, 2022

(54) ELECTRONIC APPARATUS FOR IDENTIFYING CONTENT BASED ON AN OBJECT INCLUDED IN THE CONTENT AND CONTROL METHOD THEREOF

(71) Applicant: SAMSUNG ELECTRONICS CO., LTD., Suwon-si (KR)

(72) Inventors: Minsoo Kim, Suwon-si (KR); Sungjin Kim, Suwon-si (KR); Younguk Kim, Suwon-si (KR); Jaehyun Park, Suwon-si (KR); Jiwoong Choi, Suwon-si (KR); Hyunsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 16/551,124

(22) Filed: Aug. 26, 2019

(65) Prior Publication Data
US 2020/0097730 A1    Mar. 26, 2020

(30) Foreign Application Priority Data

Sep. 21, 2018    (KR) .................. 10-2018-0113658

(51) Int. Cl.
*G06K 9/00* (2022.01)
*G06V 20/40* (2022.01)
(Continued)

(52) U.S. Cl.
CPC .......... *G06V 20/46* (2022.01); *G06K 9/6256* (2013.01); *G06N 20/00* (2019.01);
(Continued)

(58) Field of Classification Search
CPC ............ G06K 9/00744; G06K 9/6256; G06K 2209/01; G06K 9/00718; H04N 21/44008;
(Continued)

(56) References Cited

U.S. PATENT DOCUMENTS 6,834,308 B1 * 12/2004 Ikezoye ................. G06Q 20/10
709/231
9,264,785 B2    2/2016 Mallinson
(Continued)

FOREIGN PATENT DOCUMENTS

CN     105959696 A  *  9/2016
CN     105578267 A     11/2016
(Continued)

OTHER PUBLICATIONS

International Search Report (PCT/ISA/210) dated Dec. 18, 2019 issued by the International Searching Authority in International Application No. PCT/KR2019/011331.
(Continued)

*Primary Examiner* — Li Liu
(74) *Attorney, Agent, or Firm* — Sughrue Mion, PLLC

(57) ABSTRACT

An electronic apparatus includes a communicator circuitry, and a processor for obtaining multimedia data from an external apparatus via the communicator, identifying an object in at least one frame from among a plurality of frames included in the multimedia data, and identify a content corresponding to the identified object based on content guide information provided from a first server.

19 Claims, 13 Drawing Sheets

(51) Int. Cl.
 *G06K 9/62*   (2022.01)
 *H04N 21/44*   (2011.01)
 *H04N 21/466*   (2011.01)
 *G06N 20/00*   (2019.01)
 *H04N 21/472*   (2011.01)
 *G06V 30/10*   (2022.01)

(52) U.S. Cl.
 CPC ... *H04N 21/44008* (2013.01); *H04N 21/4662* (2013.01); *H04N 21/472* (2013.01); *G06V 30/10* (2022.01)

(58) Field of Classification Search
 CPC ............. H04N 21/4662; H04N 21/472; H04N 21/812; H04N 21/6581; H04N 21/4722; H04N 21/23418; H04N 21/8133; G06N 20/00; G06N 5/04; G06T 2207/10016
 See application file for complete search history.

(56) References Cited

U.S. PATENT DOCUMENTS

| | | | |
|---|---|---|---|
| 9,661,385 | B1 | 5/2017 | Cormie et al. |
| 9,721,072 | B2 | 8/2017 | Maughan et al. |
| 9,848,235 | B1 | 12/2017 | Chen |
| 9,906,831 | B2 | 2/2018 | Chen |
| 9,912,991 | B1 | 3/2018 | Cormie et al. |
| 9,966,112 | B1 | 5/2018 | Kulkarni et al. |
| 10,219,011 | B2 | 2/2019 | Jung et al. |
| 10,257,569 | B2 * | 4/2019 | Kim ................ H04N 21/47815 |
| 10,484,758 | B2 * | 11/2019 | Harron ............. H04N 21/44008 |
| 10,616,631 | B2 * | 4/2020 | Choi .................... H04N 21/812 |
| 10,616,639 | B2 * | 4/2020 | Yeo .................... H04N 21/4325 |
| 10,841,656 | B2 * | 11/2020 | Baek ...................... H04H 60/72 |
| 2007/0113248 | A1 * | 5/2007 | Hwang ................ G06F 16/739 |
| | | | 725/45 |
| 2008/0250452 | A1 | 10/2008 | Iwamoto |
| 2012/0167144 | A1 * | 6/2012 | Avison-Fell ....... H04N 1/00331 |
| | | | 725/51 |
| 2013/0347018 | A1 | 12/2013 | Limp et al. |
| 2014/0282668 | A1 * | 9/2014 | Gava ................ H04N 21/44008 |
| | | | 725/19 |
| 2015/0042882 | A1 * | 2/2015 | Park .................. H04N 21/44008 |
| | | | 348/570 |
| 2015/0128190 | A1 * | 5/2015 | Wang ..................... G06F 16/735 |
| | | | 725/53 |
| 2015/0213062 | A1 | 7/2015 | Gokturk et al. |
| 2015/0296250 | A1 | 10/2015 | Casper |
| 2016/0127759 | A1 * | 5/2016 | Jung .................. H04N 21/4394 |
| | | | 725/19 |
| 2016/0150268 | A1 * | 5/2016 | Barablin ............ H04N 21/4884 |
| | | | 725/37 |
| 2016/0360279 | A1 * | 12/2016 | Batmanglidj ...... H04N 21/8456 |
| 2017/0171629 | A1 * | 6/2017 | Soh .................... H04N 21/6582 |
| 2017/0347143 | A1 * | 11/2017 | Limp ................... H04N 21/435 |
| 2018/0225546 | A1 | 8/2018 | Hardee et al. |
| 2018/0255313 | A1 | 9/2018 | Choi |
| 2019/0050666 | A1 | 2/2019 | Kim et al. |
| 2019/0080175 | A1 * | 3/2019 | Buratti ................. G06K 9/2081 |
| 2020/0275048 | A1 * | 8/2020 | Fu ..................... H04N 21/47214 |

FOREIGN PATENT DOCUMENTS

| | | | |
|---|---|---|---|
| CN | 106462874 | A | 2/2017 |
| CN | 108012162 | A | 5/2018 |
| KR | 10-2013-0050983 | A | 5/2013 |
| KR | 10-2017-0069599 | A | 6/2017 |
| KR | 10-2017-0101076 | A | 9/2017 |
| WO | 2012027607 | A2 | 3/2012 |
| WO | WO-2017065394 | A1 * | 4/2017 ............. H04N 21/43 |

OTHER PUBLICATIONS

Written Opinion (PCT/ISA/237) dated Dec. 18, 2019 issued by the International Searching Authority in International Application No. PCT/KR2019/011331.

Chinese Office Action issued in Chinese Application No. 2019800510950 dated May 19, 2022.

* cited by examiner

FIG. 3B

| 009 | GLOBAL DOCUMENTARY (HELLO! MONKEY) |
|---|---|
| | 21:40 ━━━━━━━━━━ 22:30 |

| ALL CHANNELS | TODAY 22:00 | 22:30 |
|---|---|---|
| 007 AAA | VOCAL CHAMPION | |
| 009 BBB | GLOBAL DOCUMENTARY (HELLO! MONKEY) | |
| 011 CCC | BASEBALL TODAY | |
| 014 DDD | BELOVED IS GONE | |

ELECTRONIC APPARATUS FOR IDENTIFYING CONTENT BASED ON AN OBJECT INCLUDED IN THE CONTENT AND CONTROL METHOD THEREOF

CROSS-REFERENCE TO RELATED APPLICATION

This application is based on and claims priority under 35 U.S.C. § 119 to Korean Patent Application No. 10-2018-0113658, filed on Sep. 21, 2018, in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus identifying a content included in a multimedia data, and an electronic system.

Further, the disclosure relates to an artificial intelligence (AI) system simulating functions such as cognition, determination, and the like, of a human brain using a machine learning algorithm, and an application thereof.

2. Description of Related Art

In recent years, an artificial intelligence (AI) system realizing intelligence of a human level is used in various fields. Unlike a rule-based smart system, an artificial intelligence (AI) system is a system in which a machine learns and identifies on its own. In the AI system, a recognition rate is improved and user preferences are more accurately understood the more it is used. Thus, the rule-based smart system has been gradually replaced with a deep learning-based artificial intelligence system.

Artificial intelligence technology includes machine learning (for example, deep learning), and element technology utilizing machine learning.

Machine learning is an algorithm technology that classifies and learns features of input data on its own. Element technology is technology that simulates functions such as recognition, determination, etc., of a human brain by utilizing a machine learning algorithm such as deep learning, and the like, which may include technical fields such as linguistic understanding, visual understanding, inference/prediction, knowledge expression, motion control, and the like.

Various fields to which artificial intelligence technology is applicable are shown below. Linguistic understanding is a technology of recognizing languages and characters of human, and applying and processing the recognized human languages and characters, which may include natural language processing, machine translation, dialogue system, question and answer, voice recognition and synthesis, etc. Visual understanding is a technique to recognize an object as if the object were viewed from a human sight, which may include object recognition, object tracking, image search, human recognition, scene understanding, space understanding, image improvement, and the like. Inference and prediction is a technique of identifying information to perform logical inference and prediction, which may include knowledge/probability-based inference, optimization prediction, preference-based planning, recommendation, etc. Knowledge expression is a technique of performing automatic processing of human experience information as knowledge data, which may include knowledge construction (data generation/classification), knowledge management (data utilization), etc. Motion control is a technique of controlling autonomous driving of a vehicle and a robot motion, which may include a motion control (navigation, collision and driving), manipulation control (behavior control), etc.

For automatic contents recognition for TV content recognition, it may be necessary to construct program identification information and a title as a database. For example, for content recognition based on fingerprint, it may be necessary to acquire in advance identification information (fingerprint) of a content to be recognized, and map the acquired identification information with a title of the content and store it in a server. Further, when identification information for a current screen is acquired in a TV and transmitted to the server, the server may identify whether matching identification information is present, and provide a program title and related information of the matching identification information to the TV.

However, for the database construction described above, an additional operation or apparatus for collecting program identification information, connecting the collected program identification information to the program title, and sending it to a database server may be necessary, from which a significant cost is incurred. Further, a cost is also incurred when the TV transmits a fingerprint, etc., to the server and acquires a program title, etc.

Accordingly, a method for minimizing the server use is demanded.

The above information is presented as background information only to assist with an understanding of the disclosure. No determination has been made, and no assertion is made, as to whether any of the above might be applicable as prior art with regard to the disclosure.

SUMMARY

Aspects of the disclosure address at least the above-mentioned problems and/or disadvantages and to provide at least the advantages described below.

In accordance with an aspect of the disclosure, there is provided an electronic apparatus including a communicator including a circuitry, and a processor configured to obtain multimedia data from an external apparatus via the communicator; identify an object in at least one frame from among a plurality of frames included in the multimedia data; and identify a content corresponding to the identified object based on content guide information provided from a first server.

The processor may be further configured to: obtain a digital video fingerprint based on the at least one frame; control the communicator to transmit the obtained digital video fingerprint to a second server; and obtain content information corresponding to the digital video fingerprint from the second server via the communicator.

The processor may be further configured to: identify a type of the external apparatus; and based on the type of the external apparatus being a predetermined type, obtain the digital video fingerprint based on the at least one frame.

The processor may be further configured to: control the communicator to transmit either one or both of the identified object and the identified content to a third server; and obtain an advertisement corresponding to either one or both of the identified object and the identified content from the third server via the communicator.

The electronic apparatus may include a storage, wherein the processor may be further configured to: identify the object in the at least one frame based on an object recognition model stored in the storage, wherein the object recognition model may be obtained by training a plurality of sample images and a plurality of objects included in the plurality of sample images through an artificial intelligence algorithm.

The processor may be further configured to retrain the object recognition model based on information relating to the object and the content.

The processor may be further configured to: apply an optical character reader (OCR) to the at least one frame, from among the plurality of frames, and identify a text; and identify the content based on the identified text.

The processor may be further configured to: identify a type of the external apparatus; and based on the type of the external apparatus being a predetermined type, identify the object in the at least one frame.

The electronic apparatus may include a display, wherein the processor may be further configured to: control the display to sequentially display the plurality of frames; and identify the object in a displayed frame from among the plurality of frames.

The object may include any one or any combination of a title of a content corresponding to the at least one frame, a reproduction time of the content, channel information of the content, and a character included in the at least one frame.

In accordance with another aspect of the disclosure, there is provided a control method of an electronic apparatus, the control method including: obtaining multimedia data from an external apparatus; identifying an object in at least one frame from among a plurality of frames included in the multimedia data; and identifying a content corresponding to the identified object based on content guide information provided from a first server.

The method may further include obtaining a digital video fingerprint based on the at least one frame; transmitting the obtained digital video fingerprint to a second server; and obtaining content information corresponding to the digital video fingerprint from the second server.

The obtaining the digital video fingerprint may include: identifying a type of the external apparatus; and based on the type of the external apparatus being a predetermined type, obtaining the digital video fingerprint based on the at least one frame.

The method may further include transmitting either one or both of the identified object or the identified content to a third server; and obtaining an advertisement corresponding to either one or both of the identified object or the identified content from the third server.

The identifying the object may include: identifying the object in the at least one frame based on an object recognition model, and wherein the object recognition model may be obtained by training a plurality of sample images and a plurality of objects included in the plurality of sample images through an artificial intelligence algorithm.

The method may further include retraining the object recognition model based on information relating to the object and the content.

The identifying the object may include: applying an optical character reader (OCR) to the at least one frame from among the plurality of frames, and identifying a text, and wherein the identifying the content may include identifying the content based on the identified text.

The method may further include identifying a type of the external apparatus, wherein the identifying the object may include, based on the type of the external apparatus being a predetermined type, identifying the object in the at least one frame.

The method may further include sequentially displaying the plurality of frames, wherein the identifying the object may include identifying the object in a displayed frame, from among the plurality of frames.

The object may include any one or any combination of a title of a content corresponding to the at least one frame, a reproduction time of the content, channel information of the content, and a character included in the at least one frame.

In accordance with another aspect of the disclosure, there is provided control method of an electronic apparatus including a model learning part, the control method including: obtaining multimedia data from an external apparatus; based on an object recognition model obtained by training a plurality of sample images and a plurality of objects included in the plurality of sample images through an artificial intelligence algorithm, identifying whether an object is recognized in at least one frame from among a plurality of frames included in the multimedia data; based on the object being recognized, identifying whether a content corresponding to the recognized object is recognized; and based on the content not being recognized, obtaining a digital video fingerprint based on the at least one frame; transmitting the obtained digital video fingerprint to a server; and obtaining content information corresponding to the digital video fingerprint from the server.

The obtaining the digital video fingerprint may include: based on the content not being recognized, identifying a type of the external apparatus; and based on the type of the external apparatus being a predetermined type, obtaining the digital video fingerprint based on the at least one frame.

The predetermined type may be any one or any combination of a set-top box, an external content server, and a broadcasting server.

The identifying the type of the external apparatus may be performed before transmitting the obtained digital video fingerprint to the server.

Other aspects, advantages, and salient features of the disclosure will become apparent to those skilled in the art from the following detailed description, which, taken in conjunction with the annexed drawings, discloses one or more embodiments.

BRIEF DESCRIPTION OF THE DRAWINGS

The above and other aspects, and advantages of embodiments will be more apparent from the following description taken in conjunction with the accompanying drawings, in which:

FIG. 3B is a diagram illustrating an operation according to object identification, according to an embodiment;

The same reference numerals are used to represent the same elements throughout the drawings.

DETAILED DESCRIPTION

Figure 1A:
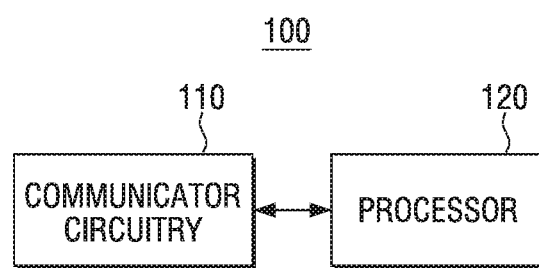
FIG. 1A is a block diagram illustrating an example configuration of an electronic apparatus, according to an embodiment.

The embodiments of the present disclosure may be diversely modified. Embodiments are illustrated in the drawings and are described in detail in the detailed description. However, it is to be understood that the present disclosure is not limited to a specific embodiment, but includes all modifications, equivalents, and substitutions without departing from the scope and spirit of the present disclosure. Also, well-known functions or constructions may not be described in detail if they would obscure the disclosure with unnecessary detail.

Hereinafter, one or more embodiments will be described in detail with reference to the accompanying drawings.

An aspect of the disclosure is to provide an electronic apparatus minimizing the use of an external server to identify a content, and a control method thereof.

In accordance with one or more embodiments, an electronic apparatus may identify a content based on an object included in at least one frame from among a plurality of frames included in a multimedia data, thereby minimizing the use of an external server in content recognition.

FIG. 1A is a block diagram illustrating an example configuration of an electronic apparatus 100;

Referring to FIG. 1A, the electronic apparatus 100 may include a communicator circuitry 110, e.g., communicator, and a processor 120.

The electronic apparatus 100 may perform communication with an external apparatus. For example, the electronic apparatus 100 may include a display such as a TV, a desktop PC, a notebook PC, a smartphone, a tablet PC, smart glasses, a smart watch and the like, and reproduce a multimedia data acquired from an external apparatus such as a set-top box (STB).

Alternatively, the electronic apparatus 100 may be an apparatus without a display, such as a speaker, a computer body, or the like. In this case, the electronic apparatus 100 may transmit a multimedia data acquired from an external apparatus such as a set-top box (STB) to an apparatus provided with a display.

Alternatively, the electronic apparatus 100 may be an element separated from a display apparatus, which may be an apparatus for performing main functions, such as an image processing function, from among functions of the display apparatus, and transmitting only the image processing result to the display apparatus. In this case, the display apparatus can be miniaturized, and the electronic apparatus 100 may acquire multimedia data from a set-top box, and transmit the acquired multimedia data to the display apparatus. Alternatively, the electronic apparatus 100 may acquire content from an external content server, a broadcasting station server, etc., process the image, and then transmit multimedia data corresponding to the content to the display apparatus.

According to an embodiment, the electronic apparatus 100 may be any apparatus that acquires a multimedia data from an external apparatus. In an embodiment, the external apparatus may be not only a set-top box, but also an external content server, a broadcasting station server, a satellite cable server, and the like. Further, the external apparatus may be a universal serial bus (USB), a compact disc (CD), a game machine, a set top, etc., and may be any apparatus that can provide a multimedia data to the electronic apparatus 100. Further, the multimedia data may include at least one from among a video data or an audio data.

The electronic apparatus 100 may be an electronic apparatus identifying a content from the multimedia content. The specific operations thereof will be described in detail below.

The communicator comprising the circuitry 110 is an element for performing communication with various apparatuses. For example, the communicator comprising the circuitry 110 may support various communication schemes such as Bluetooth (BT), Bluetooth low energy (BLE), wireless fidelity (Wi-Fi), Zigbee, and the like. However, embodiments are not limited thereto, and the communicator comprising the circuitry 110 may support any communication scheme in which wireless communication is possible from among communication standards.

Further, the communicator comprising the circuitry 110 may include a communication interface capable of wired communication with various apparatuses. For example, the communicator comprising the circuitry 110 may include a communication interface such as high-definition multimedia interface (HDMI), mobile high-definition link (MHL), universal serial bus (USB), red-green-blue (RGB), D-subminiature (D-sub), digital visual interface (DVI), and the like, and may perform communication with various servers.

The electronic apparatus 100 may be connected with an external apparatus, and acquire a multimedia data. In this case, the electronic apparatus 100 may be connected to the external apparatus through a communication interface such as high-definition multimedia interface (HDMI), DisplayPort (DP), thunderbolt, universal serial bus (USB), red-green-blue (RGB), D-subminiature (D-sub), digital visual interface (DVI) and the like, and the communicator comprising the circuitry 110 may include all wired communication interfaces. Further, the wired communication interface may include not only a standard performing a video input and an audio input through one port, but also a standard performing a video input and an audio input through two ports.

However, embodiments are not limited thereto, and the wired communication interface may be any standard capable of performing either one or both of a video input and an audio input.

The communicator comprising the circuitry 110 may include an interface of all communication schemes capable of performing wired communication with various apparatuses, as well as the wired communication interfaces described above.

The processor 120 includes various processing circuitry and controls a general operation of the electronic apparatus 100.

According to an embodiment, the processor 120 may be implemented as a digital signal processor (DSP), a micro-processor and a time controller (TCON), but is not limited thereto. The processor 120 may include at least one from among various processing circuitry such as, for example, and without limitation, a central processing unit (CPU), a micro controller unit (MCU), a micro processing unit (MPU), a controller, an application processor (AP), a communication processor (CP) or an ARM processor, or may be defined as the corresponding term. In addition, the processor 120 may be implemented as a system on chip (SoC) with a built-in processing algorithm, and a large scale integration (LSI) and may be implemented as a field programmable gate array (FPGA).

The processor 120 may acquire a multimedia data from an external apparatus through the communicator comprising the circuitry 110. According to an embodiment, the external apparatus may be an apparatus that provides a multimedia data corresponding to a content to the electronic apparatus 100, such as a set-top box. That is, the external apparatus may perform image processing of the content and provide a multimedia data to the electronic apparatus 100, and the electronic apparatus 100 may provide the acquired multimedia content to the display apparatus without additional image processing or may directly display the acquired multimedia content.

Meanwhile, the external apparatus may include content information in the multimedia content and provide the multimedia data in which the content information is included to the electronic apparatus 100. For example, the external apparatus may provide, to the electronic apparatus 100, a multimedia content in which a content title, channel information, etc., are added to a frame corresponding to a current time point from among a content of a total of 10000 frames. Further, the external apparatus may include content information in a plurality of consecutive frames and provide the plurality of consecutive frames in which the content information is included to the electronic apparatus 100.

The processor 120 may identify an object in at least one frame from among a plurality of frames included in the multimedia data. For example, the processor 120 may identify a monkey in at least one frame from among a plurality of frames included in the multimedia data. Alternatively, the processor 120 may identify a graphic data added by the external apparatus in at least one frame included in the multimedia data, and identify a content title, channel information, etc., from the graphic data. In an embodiment, the object may include at least one from among a character, a logo, a line, goods or text.

Alternatively, the processor 120 may identify an object from an audio data included in the multimedia data. In this case, the processor 120 may identify the object by a preset time period instead of identifying the object at a specific point such as a frame. For example, the processor 120 may identify a character based on a speech during a first time period of the audio data included in the multimedia data. Hereinafter, for convenience of explanation, it is assumed that an object is identified in a frame.

The processor 120 may identify a content corresponding to the identified object based on content guide information provided from a first server. For example, when a monkey is identified, the processor 120 may identify a monkey documentary corresponding to a monkey from the content guide information. According to an embodiment, the content guide information may include at least one of a reproduction time, title, channel information, summary information, characters, story, of a content provided by a broadcasting station, etc., or an advertisement for the content itself, such as an electronic program guide (EPG). Further, the content information may include at least one of an advertisement immediately before a reproduction time of the content, an advertisement during reproduction, or an advertisement immediately after reproduction.

The processor 120 may acquire content guide information from the first server, and identify a content corresponding to the identified object based on the acquired content guide information. Alternatively, the processor 120 may search content guide information stored in the first server and identify a content corresponding to the identified object.

The processor 120 may, when identifying a content corresponding to the identified object based on content guide information provided from the first server, further consider current time information and category. For example, when a monkey is identified, the processor 120 may identify a content corresponding to the monkey from among contents corresponding to a current time from the content guide information. Alternatively, the processor 120 may, when a monkey is identified, identify a content related to monkeys from a documentary from among movies, documentaries, entertainment and dramas included in the content guide information. If a content corresponding to the object is not identified in a current time or in a specific category, the processor 120 may identify a content corresponding to the object in another time or category.

The first server described above may be an apparatus separate from the external apparatus. For example, the first server may be an apparatus providing a content to the external apparatus. Further, the first server may be an apparatus that provides not only a content but also content guide information to the external apparatus. However, the electronic apparatus 100 may not acquire content guide information from the external apparatus. This is because an external apparatus such as a set-top box must be provided with an additional function in order to provide content guide information to the external apparatus 100. That is, the external apparatus is an apparatus which focuses on a function of providing multimedia data to the electronic apparatus 100, but the first server may be a general purpose apparatus capable of providing various functions as well as providing a content and content guide information. Accordingly, the processor 120 may acquire the content guide information from the first server rather than the external apparatus.

Meanwhile, the processor 120 may, when no content is identified, acquire a fingerprint, e.g., a digital video fingerprint, based on at least one frame, control the communicator comprising the circuitry 110 to transmit the acquired fingerprint to a second server, and acquire content information corresponding to the fingerprint from the second server via the communicator comprising the circuitry 110.

The processor 120 may not identify a content through object recognition. For example, the processor 120 may not identify a content corresponding to the identified monkey from the content guide information. In this case, the processor 120 may acquire content information through the first server using a fingerprint.

According to an embodiment, the second server is a server which stores a plurality of contents and a fingerprint for each frame included in each of the plurality of contents, and when a fingerprint is acquired from the electronic apparatus, transmits content information corresponding to the fingerprint to the electronic apparatus 100, which may be an apparatus separate from the first server. However, embodiments are not limited thereto, and the first server and the second server may be of the same size.

In contrast, when a content is identified, the processor 120 may not acquire a fingerprint. This is because, when a content is identified by object recognition, it is not necessary to recognize the content using a fingerprint.

Further, the fingerprint is identification information capable of distinguishing one frame from another, which refers to intrinsic data of each frame. For example, the fingerprint is feature data acquired from a video, image or audio signal included in a frame, and reflects characteristics inherent to a signal itself, unlike text-based metadata. Accordingly, the fingerprint is also referred to as fingerprint data, DNA data or gene data. For example, in a case of an image or a video signal, the fingerprint may be a data expressing features such as a motion vector, color and the like.

The fingerprint may be acquired by various algorithms. For example, an audio signal may be divided at predetermined time periods, and a magnitude of a signal of frequencies included in the respective time periods may be calculated. Further, a fingerprint data may be generated by obtaining a frequency slope by calculating a difference of magnitudes between signals of adjacent frequency intervals, and quantizing the calculated frequency slope by 1 when the slope is positive and by 0 when the slope is negative. However, embodiments are not limited thereto, and the fingerprint may be acquired in various ways.

Alternatively, the processor 120 may, when no content is identified, identify a type of external apparatus, and when the type of external apparatus is a predetermined type, acquire a fingerprint based on at least one frame. Further, the processor 120 may control the communicator comprising the circuitry 110 to transmit the acquired fingerprint to the second server, and acquire content information corresponding to the fingerprint from the second server via the communicator comprising the circuitry 110. That is, the processor 120 may identify the type of external apparatus before transmitting the fingerprint to the second server.

For example, the processor 120 may, when no content is identified, identify the type of external apparatus, and when the type of external apparatus is a set-top box, an external content server, a broadcasting station server, etc., acquire a fingerprint and acquire content information via the second server.

In contrast, when the type of external apparatus is a smartphone, a game console, a digital video recorder (DVR), a DVD player, etc., the processor 120 may not acquire a fingerprint. For example, when the electronic apparatus 100 is mirrored with a smartphone, the processor 120 may acquire a screen displayed on the smartphone as a multimedia content. However, a fingerprint corresponding to the screen displayed on the smartphone may not be stored in the second server. Thus, even when the processor 120 transmits the fingerprint to the second server, the processor 120 may not acquire content information. Accordingly, when the type of external apparatus is not a predetermined type, the processor 120 may not acquire a fingerprint. In this case, the processor 120 may stop an operation for identifying the content.

In the above-described embodiment, a type of external apparatus is identified after an object is identified, but embodiments are not limited thereto. For example, the processor 120 may first identify a type of external apparatus, and when the type of the external apparatus is a predetermined type, identify an object in at least one frame.

For example, the processor 120 may identify the type of the external apparatus, and when the type of the external apparatus is a set-top box, an external content server, a broadcasting server and the like, identify an object. When the type of the external apparatus is a smartphone, a game console, a DVR, and the like, the processor 120 may not identify an object. For example, when the electronic apparatus 100 is mirrored with a smartphone, the processor 120 may acquire a screen displayed on the smartphone as a multimedia content. However, an object identified from a screen displayed on a smartphone may not be related to content guide information. Further, a fingerprint corresponding to a screen displayed on a smartphone may not be stored in the second server. Accordingly, when the type of external apparatus is not a predetermined type, the processor 120 may not perform an object identification operation and a fingerprint acquisition operation. In this case, the processor 120 may stop an operation for identifying the content.

In the above-described embodiment, a type of external apparatus is identified, but embodiments are not limited thereto. For example, the processor 120 may identify a method for communicating with an external apparatus. When the communication method is mirroring, USB, and the like, the processor 120 may not identify an object and may identify an object when the communication method is a remaining communication method. Alternatively, the processor 120 may first identify an object, and when no content is identified, identify a method for communicating with an external apparatus. Further, when the communication method with the external apparatus is mirroring, USB, and the like, the processor 120 may not acquire a fingerprint, and may acquire a fingerprint when the communication method is a remaining communication method. Alternatively, the processor 120 may identify whether an object is identified based on a multimedia data acquired from an external apparatus.

The processor 120 may control the communicator comprising the circuitry 110 to transmit at least one of an identified object or content to a third server, and acquire an advertisement corresponding to at least one of the identified object or content from the third server via the communicator comprising the circuitry 110. Through this operation, the third server may acquire a viewing history of the user, and provide an advertisement based on the viewing history of the user. For example, when a large number of viewing histories of movies are present in the user viewing history, the third server may provide a movie trailer, new movie information, etc., to the electronic apparatus 100.

Further, the processor 120 may identify a content based on a viewing history of a user. For example, when a viewing history of movie contents of a user of the electronic apparatus 100 is larger than a viewing history of dramas, the processor 120 may store user information regarding the viewing history in a storage. Thereafter, the processor 120 may identify a specific actor or actress from a multimedia data through recognition. Further, the processor 120 may, even when a specific actor or actress is starring in both movies and dramas, identify the multimedia data as one of the movies based on user information stored in the storage.

Further, the processor 120 may, even when no content is identified, control the communicator comprising the circuitry 110 to transmit the user information stored in the storage to the third server, and acquire an advertisement corresponding to the user information from the third server via the communicator comprising the circuitry 110. For example, when a large number of viewing histories of movies are present in the user viewing history, the third server may provide a movie trailer, new movie information, etc., to the electronic apparatus 100 regardless of a type of content viewed by a current viewer.

In an embodiment, the third server may be a server separate from the first server and the second server. However, embodiments are not limited thereto, and the third server may be the same server as at least one of the first server or the second server.

The electronic apparatus 100 may further include a storage and may identify an object in at least one frame based on an object recognition model stored in the storage. In an embodiment, the object recognition model may be acquired by training a plurality of sample images and a plurality of objects included in the plurality of sample images through an artificial intelligence algorithm.

According to an embodiment, the storage may be an element separate from the processor 120. However, embodiments are not limited thereto, and a storage in which an object recognition model may be provided within the processor 120. Alternatively, the processor 120 itself may be implemented in hardware to correspond to the object recognition model. Hereinafter, for the convenience of explanation, it will be assumed that the storage and the processor 120 are separate elements.

The object recognition model may be trained in another electronic apparatus and acquired. However, embodiments are not limited thereto, and the electronic apparatus 100 may directly acquire the object recognition model by training a plurality of sample images and a plurality of objects included in the plurality of sample images through an artificial intelligence algorithm.

Further, the processor 120 may retrain the object recognition model based on information on the object and content. For example, the processor 120 may, when a monkey is repeatedly identified, acquire an artificial intelligence algorithm with improved identification speed and accuracy of monkey by retraining.

The processor 120 may apply an optical character reader (OCR) to at least one frame from among a plurality of frames and identify a text, and identify a content based on the identified text.

The processor 120 may compare the identified text with content guide information and acquire content information. Alternatively, the processor 120 may not compare the identified text with the content guide information and may identify the identified text itself as the content information.

The electronic apparatus 100 may further include a display and may control the display to sequentially display a plurality of frames, and identify an object in a displayed frame from among the plurality of frames.

For example, the processor 120 may identify the object after a video frame is acquired and displayed, rather than identifying the object as the video frame is acquired. That is, the processor 120 may identify the object only when the user views a content corresponding to the video frame. A content viewing history of the user may be acquired through this operation.

The object described above may include at least one of a title of content corresponding to at least one frame, a reproduction time of the content, channel information of the content, or a character included in at least one frame.

Figure 1B:
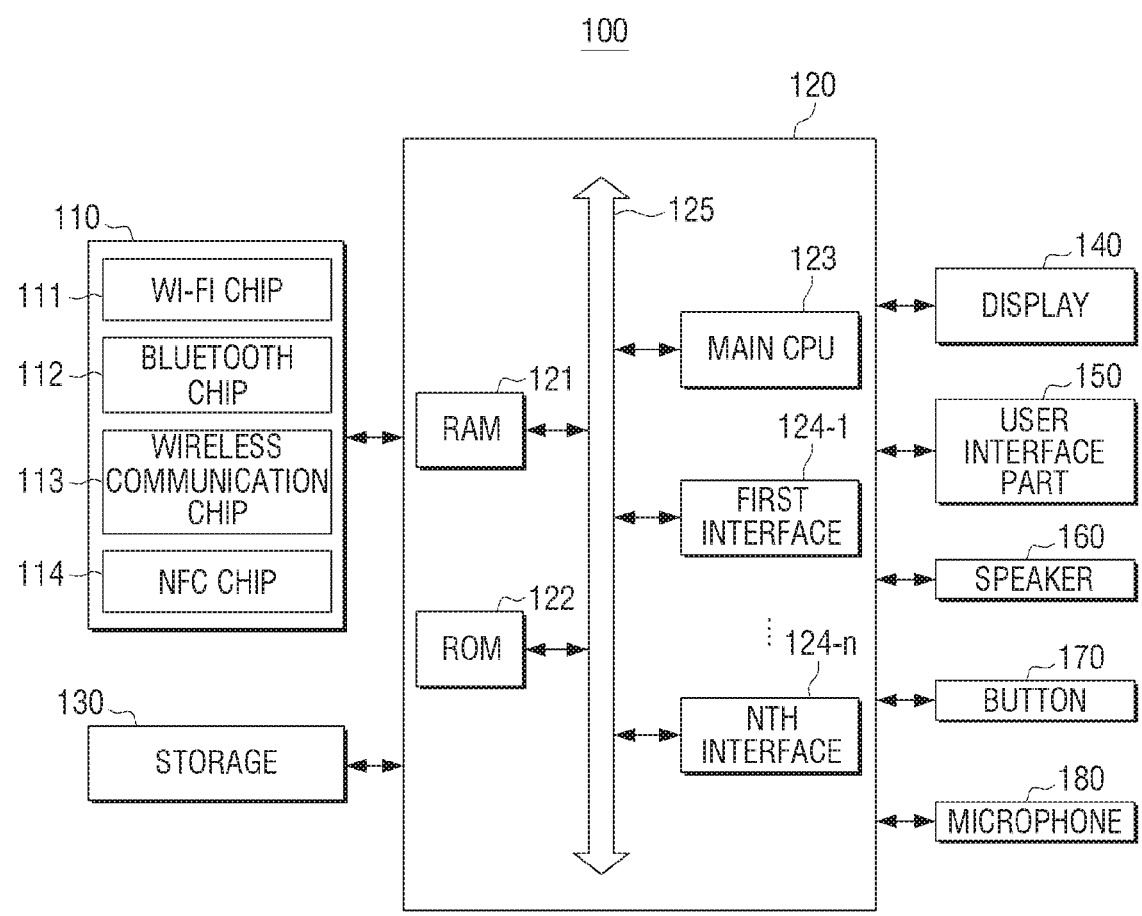
FIG. 1B is a block diagram illustrating in detail an example configuration of an electronic apparatus, according to an embodiment.

FIG. 1B is a block diagram illustrating in detail an example configuration of an electronic apparatus 100. The electronic apparatus 100 may include a communicator circuitry 110, and a processor 120. Referring to FIG. 1B, the electronic apparatus 100 may include a storage 130, a display 140, a user interface part 150, a speaker 160, a button 170 and a microphone 180. Detailed descriptions of constitutional elements illustrated in FIG. 1B that are redundant with constitutional elements in FIG. 1A are omitted.

The processor 120 may control the overall operations of the electronic apparatus 100 using various programs stored in the storage 130.

In detail, the processor 120 may include a random access memory (RAM) 121, a read only memory (ROM) 122, a main central processing unit (CPU) 123, first through nth interfaces 124-1 through 124-n, and a bus 125.

The RAM 121, the ROM 122, the main CPU 123, the first through nth interface 124-1 through 124-n, etc., may be connected to each other via the bus 125.

The first to the nth interfaces 124-1 to 124-n may be connected to the various elements described above. One of the interfaces may be a network interface which is connected to an external apparatus via a network.

The main CPU 123 may access the storage 130, and perform booting using an operating system (O/S) stored in the storage 130. In addition, the main CPU 123 may perform various operations using various programs stored in the storage 130.

The ROM 122 may store a set of instructions for system booting. When a turn-on command is input and power is supplied, the main CPU 123 may, according to an instruction stored in the ROM 122, copy the O/S stored in the storage 130 to the RAM 121, and execute O/S to boot the system. If the booting is completed, the main CPU 123 may copy various application programs stored in the storage 130 to the RAM 121 and execute the application programs copied to the RAM 121, thereby performing various operations.

The main CPU 123 may provide a screen including various objects such as an icon, an image, text and the like. The main CPU 123 may acquire an attribute value such as a coordinate value at which each object will be indicated, form, size and color according to a screen layout based on an acquired control command. The main CPU 123 may provide a screen of various layouts including an object based on the acquired attribute value. The provided screen is displayed in a display area of the display 140.

The processor 120 may perform processing on audio data. The processor 120 may perform various processing, such as decoding, amplification, and noise filtering of the audio data.

Further, the processor 120 may perform processing on multimedia data. The processor 120 may perform various kinds of image processing such as a decoding, a scaling, a noise filtering, a frame rate converting, a resolution converting, and the like, on multimedia data.

The operation of the above-described processor 120 may be performed by a program stored in the storage 130.

The storage 130 may store a variety of data, such as an operating system (O/S) software module for operating the electronic apparatus 100, an object recognition module, an object recognition artificial intelligence module, an artificial intelligence training module or an optical character recognition (OCR) module.

The communicator comprising the circuitry 110 is an element to perform communication with various types of external apparatuses according to various types of communication methods. The communicator comprising the circuitry 110 may include a Wi-Fi chip 111, a Bluetooth chip 112, a wireless communication chip 113 and a near field communication (NFC) chip 114.

The Wi-Fi chip 111 and the Bluetooth chip 112 may perform communication according to a Wi-Fi method and a Bluetooth method, respectively. In a case in which the Wi-Fi chip 111 or the Bluetooth chip 112 is used, a variety of access information such as SSID, a session key, and the like, may be first transmitted and acquired, a communication access may be performed using the variety of access information, and a variety of information may be then transmitted and acquired. The wireless communication chip 113 indicates a chip which performs communication in accordance with various communication standards such as IEEE, Zigbee, 3rd generation (3G), 3rd generation partnership project (3GPP), and long term evolution (LTE) or the like. The NFC chip 114 means a chip which is operated in the NFC scheme that uses a frequency band of 13.56 MHz among various RF-ID frequency bands such as 135 kHz, 13.56 MHz, 433 MHz, 860 to 960 MHz, 2.45 GHz, and the like.

Further, the communicator comprising the circuitry 110 may further include a wired communication interface such as HDMI, MHL, USB, DP, thunderbolt, RGB, D-SUB, DVI and the like. The processor 120 may be connected to an external apparatus through a wired communication interface of the communicator comprising the circuitry 110. In this case, the processor 120 may acquire a multimedia data from the external apparatus through the wired communication interface.

The display 140 may be implemented as various types of displays, such as a liquid crystal display (LCD), an organic light emitting diodes (OLED) display, and a plasma display panel (PDP). The display 140 may further include a driver circuit that may be realized as an amorphous-silicon thin film transistor (a-si TFT), low temperature poly silicon (LTPS) thin film transistor (TFT), or organic TFT (OTFT), and a backlight unit. The display 140 may be a touch screen including a touch sensor.

The user interface part 150 may acquire various user interactions. In an embodiment, the user interface part 150 may be implemented in various forms according to implementing embodiments of the electronic apparatus 100. For example, the user interface part 150 may be implemented as a button provided on the electronic apparatus 100, a microphone acquiring a user speech, a camera detecting a user motion, etc. Further, when the electronic apparatus 100 is implemented to be a mobile terminal based on touch, the user interface part 150 may be implemented to be touch screen that forms an interlayer structure with a touch pad. The user interface part 150 may be used as the above-described display 140.

The speaker 160 outputs various audio data processed by the processor 120 and various notification sounds or voice messages, etc.

The button 170 may include various types of buttons, such as a mechanical button, a touch pad, a wheel, etc., which are formed on the front, side, or rear of the exterior of a main body of the electronic apparatus 100.

The microphone 180 acquires a user speech or other sounds and converts the user speech or other sounds into audio data.

Figure 1C:
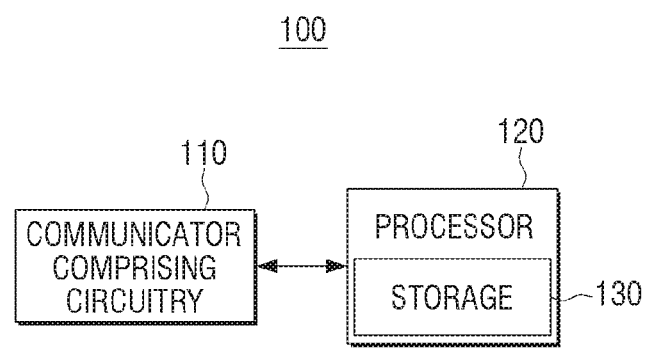
FIG. 1C is a block diagram illustrating another example configuration of an electronic apparatus, according to an embodiment.

FIG. 1C is a block diagram illustrating another example configuration of an electronic apparatus. Referring to FIG. 1C, the electronic apparatus 100 may include a communicator circuitry 110, and a processor 120, and the processor 120 may include a storage 130, in which an object recognition model is stored. That is, the processor 120 may be manufactured in the form of an on-chip including an object recognition model. In an embodiment, the storage 130 may be implemented as cache memory, a register file and a buffer.

Through the method described above, the processor 120 may identify a content with minimal fingerprint acquisition.

Hereinafter, an operation of the electronic apparatus 100 will be described in greater detail with reference to the accompanying drawings.

Figure 2:
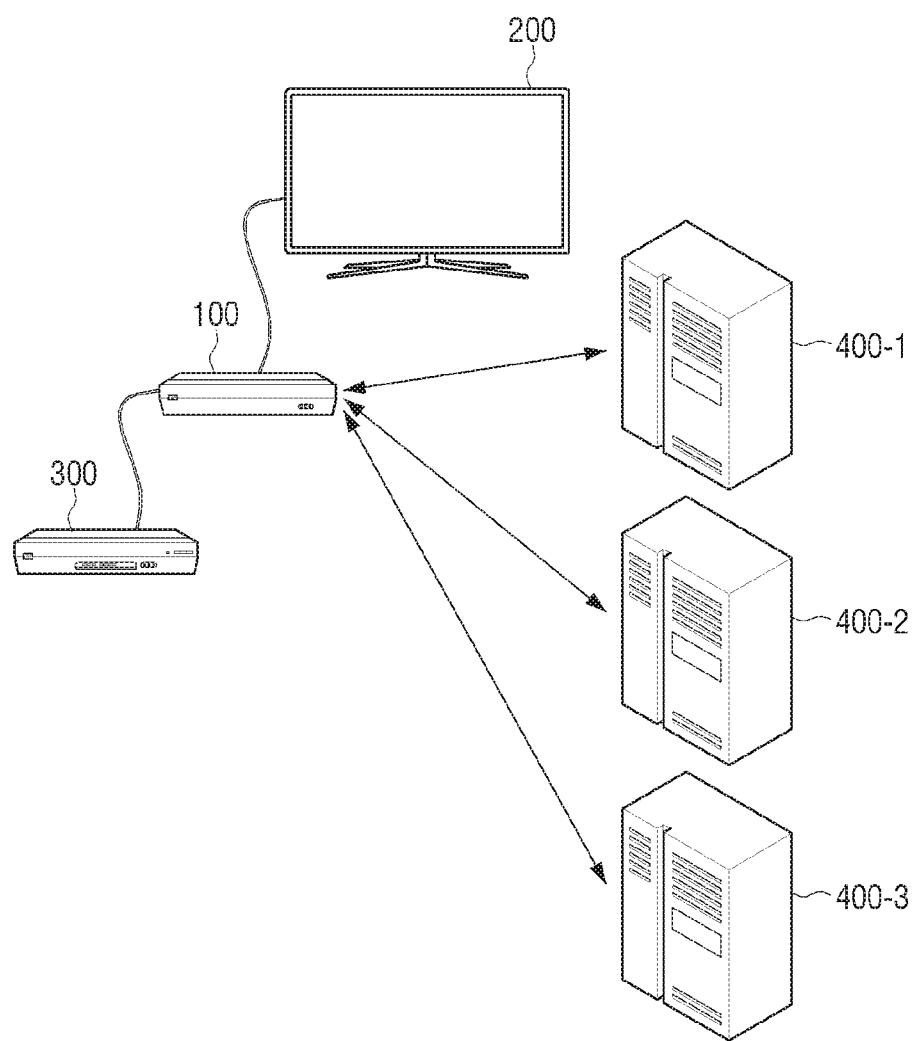
FIG. 2 is a diagram briefly illustrating an entire system, according to an embodiment.

FIG. 2 is a diagram briefly illustrating an entire system, according to an embodiment.

Referring to FIG. 2, the electronic apparatus 100 may be connected to a display apparatus 200, an external apparatus 300, a first server 400-1, a second server 400-2 and a third server 400-3.

The processor 120 may transmit multimedia data acquired from the external apparatus 300 to the display apparatus 200. The processor 120 may identify an object from the multimedia data, and identify a content based on content guide information provided from the first server 400-1. In an embodiment, the content guide information may be information stored in the electronic apparatus 100 before the multimedia data is acquired. However, embodiments are not limited thereto, and the processor 120 may, when the multimedia data is acquired, request content guide information to the first server 400-1 and acquire the requested content guide information.

Further, the processor 120 may, when no content is recognized and the external apparatus 300 is a predetermined apparatus, acquire a fingerprint based on at least one frame included in the multimedia content, transmit the acquired fingerprint to the second server 400-2, and acquire content information corresponding to the fingerprint from the second server 400-2.

Further, the processor 120 may transmit at least one of the identified object or content to the third server 400-3, and acquire an advertisement corresponding to at least one of the identified object or content from the third server 400-3. The processor 120 may transmit the acquired advertisement to the display apparatus 200.

According to an embodiment illustrated in FIG. 2, the electronic apparatus 100 and the display apparatus 200 are separate from each other, but embodiments are not limited thereto. For example, the electronic apparatus 100 and the display apparatus 200 may be implemented in one apparatus. Alternatively, the electronic apparatus 100 may be implemented as a USB and may be used as being connected to the display apparatus 200.

Further, according to an embodiment illustrated in FIG. 2, the first server 400-1, the second server 400-2 and the third server 400-3 are separate from each other. However, at least two of the first server 400-1, the second server 400-2 and the third server 400-3 may be implemented in one server.

Figure 3A:
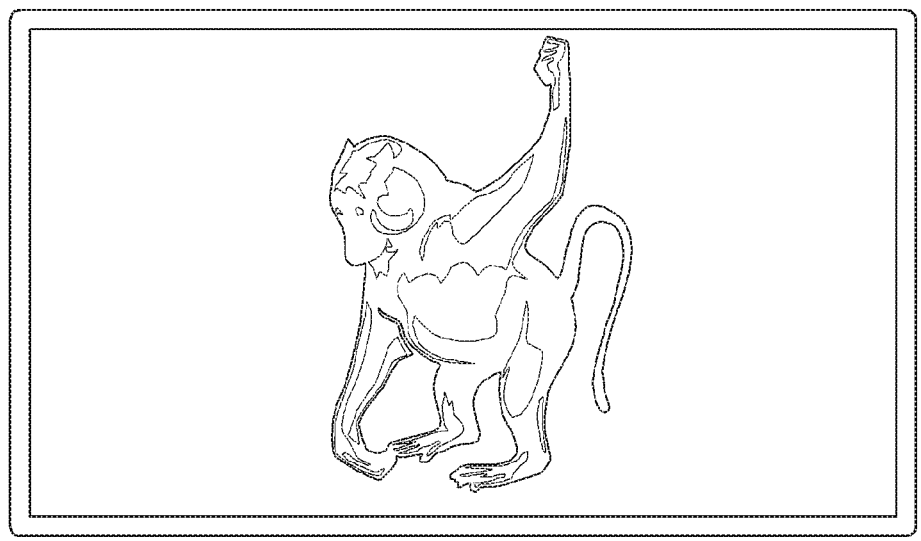
FIG. 3A is a diagram illustrating an operation according to object identification, according to an embodiment.
Figure 3C:
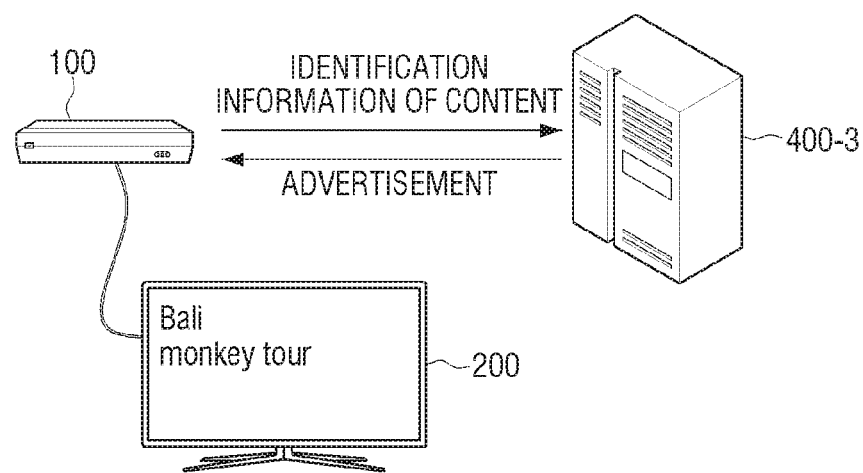
FIG. 3C is a diagram illustrating an operation according to object identification, according to an embodiment.

FIG. 3A is a diagram illustrating an operation according to object identification, according to an embodiment. FIG. 3B is a diagram illustrating an operation according to object identification, according to an embodiment. FIG. 3C is a diagram illustrating an operation according to object identification, according to an embodiment.

The processor 120 may identify an object in at least one frame from among a plurality of frames included in the multimedia data. For example, the processor 120 may identify a monkey in a frame, as illustrated in FIG. 3A.

However, embodiments are not limited thereto, and the processor 120 may identify at least one of a title of content, a reproduction time of content, channel information of content, a character included in at least one frame, a logo, a content image, a type of external apparatus, a postal code, a keyword, a genre, a viewing rate or a review.

Meanwhile, the processor 120 may identify an object in a plurality of frames included in the multimedia content. For example, the processor 120 may, when a monkey as in FIG. 3A is identified in a predetermined number of frames, identify a content corresponding to the monkey based on content guide information. In an embodiment, the plurality of frames may be consecutive frames.

Alternatively, the processor 120 may identify an object in a specific area of a frame. For example, the processor 120 may divide the frame into 3×3 areas and identify an object in the middle area.

In FIG. 3A, a screen in which additional information is not included in a content is illustrated, but embodiments are not limited thereto. For example, an external apparatus may transmit a multimedia data in which on screen display (OSD) information is included in a frame as in FIG. 3A to the electronic apparatus 100. In this case, the processor 120 may apply optical character recognition (OCR) to the frame and acquire OSD information. Alternatively, the processor 120 may perform both OSD information recognition and object recognition. For example, the processor 120 may identify a text included in the frame as OSD information, and identify the monkey through object recognition. Further, the processor 120 may identify a content based on the identified text or the identified monkey.

According to an embodiment, the processor 120 may identify an object excluding some areas in which OSD information is included. For example, when OSD information is included at a lower end of the frame, the processor 120 may identify the object in the remaining area other than the lower end of the frame in which the OSD information is stored.

The processor 120 may, when the object is identified, identify a content corresponding to the object based on content guide information. For example, the processor 120 may identify a global documentary (Hello! Monkey) corresponding to the monkey based on content guide information as illustrated in FIG. 3B.

In FIG. 3B, a content guide information screen displayed to a viewer is illustrated and content guide information stored in the electronic apparatus 100 may be in a text format. Further, the content guide information may further include an image, and the processor 120 may identify an object from the image included in the content guide information, and compare an object identified in the frame with an object identified in the image included in the content guide information and identify a content.

The processor 120 may control the communicator comprising the circuitry 110 to transmit identification information of the content to the third server 400-3, and acquire an advertisement corresponding to the identification information of the content from the third server 400-3 via the communicator comprising the circuitry 110. For example, the processor 120 may, as illustrated in FIG. 3C, control the communicator comprising the circuitry 110 to transmit information on the global documentary (Hello! Monkey) identified in FIG. 3B, and acquire a travel advertisement of a high relevance to the global documentary (Hello! Monkey) from the third server 400-3 via the communicator comprising the circuitry 110.

However, embodiments are not limited thereto, and the processor 120 may transmit the identified object and viewing history of the user as well as the identification information of the content to the third server 400-3.

In the example described above, the acquired advertisement is a product advertisement corresponding to at least one of the identified object or the identified content, but is not limited thereto. For example, the acquired advertisement may be a content related to the identified content. For example, the acquired advertisement may be a preview of the next episode of the identified content.

Figure 4:
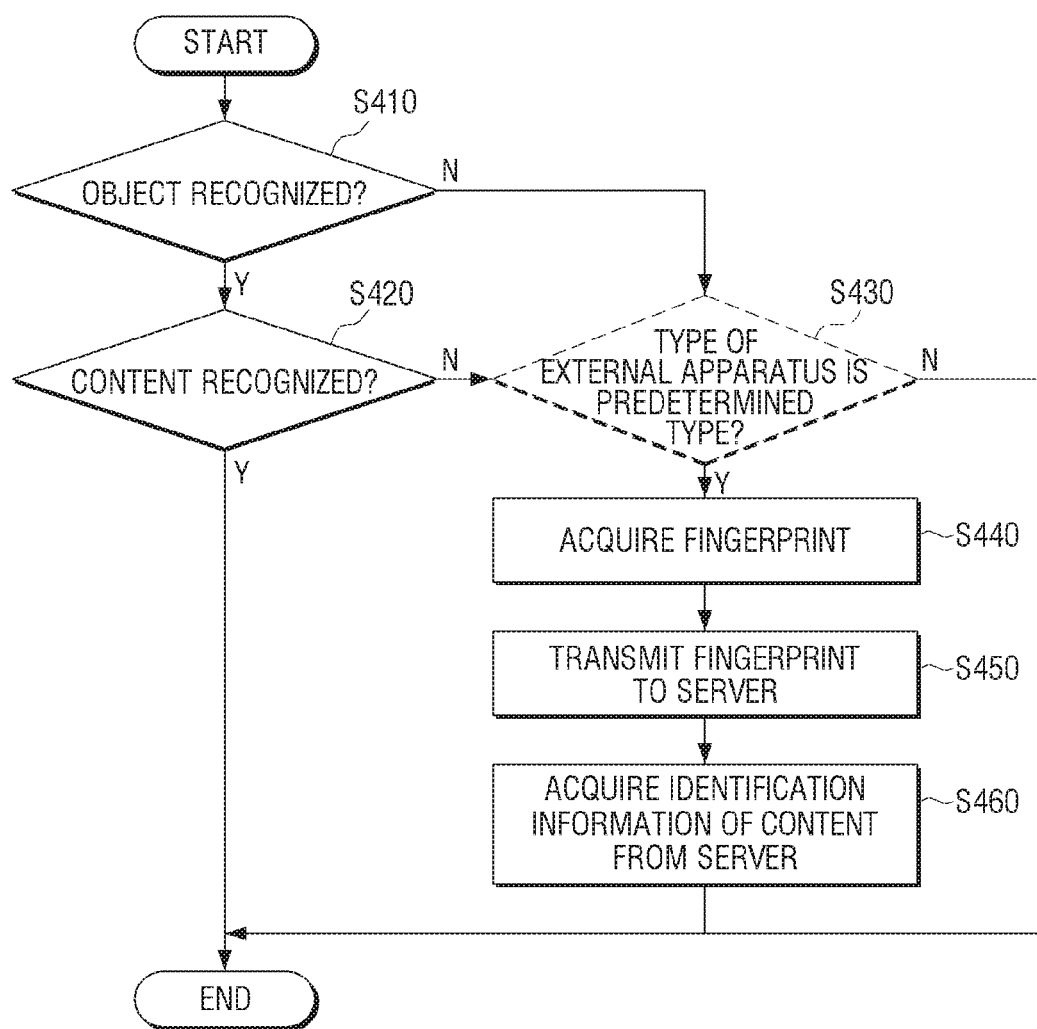
FIG. 4 is a flowchart illustrating a process of a content recognition method, according to an embodiment.

FIG. 4 is a flowchart illustrating a process of a content recognition method, according to an embodiment.

The processor 120 may first identify an object in at least one frame from among a plurality of frames included in the multimedia data, at operation S410. Further, when the object is identified, S410-Y, the processor 120 may identify a content based on the recognized object, at operation S420. The processor 120 may, when the content is identified, S420-Y, terminate an operation.

Alternatively, the processor 120 may, when the object is not identified, S410-N or the content is not identified, S420-N, identify whether a type of external apparatus is a predetermined type, at operation S430. When the type of external apparatus is a predetermined type, S430-Y, the processor 120 may acquire a fingerprint in at least one frame from among the plurality of frames, at operation S440.

The processor 120 may transmit the fingerprint to a server, at operation S450, and acquire identification information of a content corresponding to the fingerprint from the server, at operation S460.

The processor 120 may, when the identification information of the content is acquired from the server, terminate an operation.

Alternatively, the processor 120 may, when the type of external apparatus is not a predetermined type, S430-N, terminate the operation. This is a case where it is identified that even if the fingerprint is transmitted to the server, the identification information of the content cannot be received. For example, the type of external apparatus may be a smartphone, a game console, or the like.

Meanwhile, the processor 120 may, when the object is not identified, S410-N, or the content is not identified, S420-N, skip the operation S430 of identifying whether the type of external apparatus is a predetermined type, and immediately acquire a fingerprint in at least one frame from among the plurality of frames, at operation S440.

Figure 5:
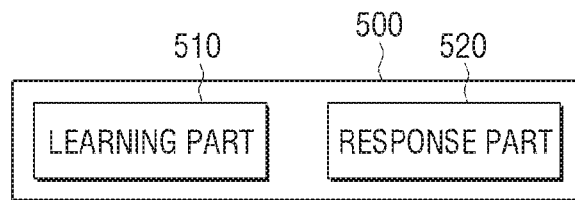
FIG. 5 is a block diagram illustrating a configuration of another electronic apparatus, according to an embodiment.

FIG. 5 is a block diagram illustrating a configuration of another electronic apparatus 500, according to an embodiment. In an embodiment, the another electronic apparatus 500 may be an apparatus acquiring an object recognition model through an artificial intelligence algorithm.

Referring to FIG. 5, the another electronic apparatus 500 may include at least one of a learning part 510 or a response part 520.

The learning part 510 may provide or train an artificial intelligence model for identifying an object using learning data. The learning part 510 may provide an identification model including identification criteria by using collected learning data.

The response part 520 may acquire an object included in a predetermined image using a predetermined data as an input data of the trained artificial intelligence model.

According to an embodiment, the learning part 510 and the response part 520 may be included in another external server 500. However, this is only an example, and the learning part 510 and the response part 520 may be mounted within the electronic apparatus 100. For example, at least a part of the learning part 510 and at least a part of the response part 520 may be implemented as a software module or manufactured as at least one hardware chip and mounted in the electronic apparatus 100. For example, at least one of the learning part 510 or the response part 520 may be manufactured in the form of a hardware chip exclusive for artificial intelligence (AI) or may be manufactured as a part of a previous general purpose processor (e.g., CPU or application processor) or a dedicated graphics processor (e.g., GPU) and mounted in the various electronic apparatuses described above. The hardware chip exclusive for artificial intelligence is an exclusive processor specialized for probability calculation, which may show high parallel processing performance as compared with a general purpose processor so that calculation operations in the artificial intelligence field such as machine learning may be processed quickly. When the learning part 510 and the response part 520 are implemented as a software module (or a program module including an instruction), the software module may be stored on non-transitory computer readable media. In this case, the software module may be provided by an operating system (OS) or by a predetermined application. Alternatively, a part of the software module may be provided by the operating system (OS) and the remaining part may be provided by the predetermined application.

In this case, the learning part 510 and the response part 520 may be mounted in one electronic apparatus or may be respectively mounted in additional electronic apparatuses. For example, one of the learning part 510 or the response part 520 may be included in the electronic apparatus 100 and the remaining one may be included in the another electronic apparatus 500. The learning part 510 and the response part 520 may provide the model information constructed by the learning part 510 to the response part 520 via wire or wirelessly, or the data input to the learning part 520 may be provided to the learning part 510 as additional learning data.

Figure 6:
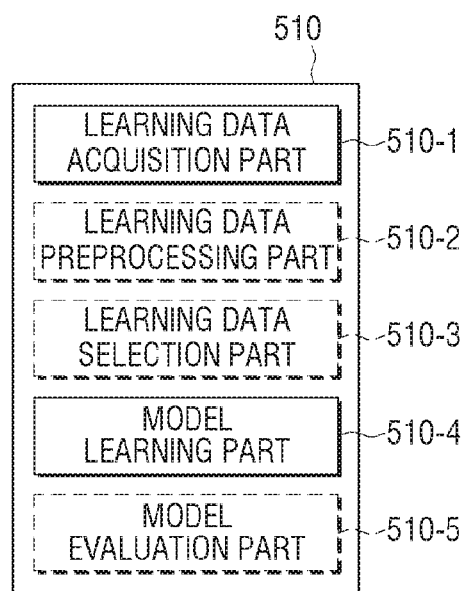
FIG. 6 is a block diagram illustrating a learning part, according to an embodiment.

FIG. 6 is a block diagram illustrating the learning part 510, according to an embodiment.

Referring to FIG. 6, the learning part 510 according to one or more embodiments may include a learning data acquisition part 510-1 and a model learning part 510-4. In addition, the learning part 510 may further selectively include at least one of a learning data preprocessing part 510-2, a learning data selection part 510-3, or a model evaluation part 510-5.

The learning data acquisition part 510-1 may acquire a learning data necessary for an artificial intelligence model for identifying an object. In an embodiment, the learning data acquisition part 510-1 may acquire a plurality of sample images and a plurality of objects included in the plurality of sample images as learning data. The learning data may be a data collected or tested by the learning part or the manufacturer of the learning part 510.

The model learning part 510-4 may train an artificial intelligence model to include criteria for identifying an object from an image, using the learning data. For example, the model learning part 510-4 may train an artificial intelligence model through supervised learning using at least a part of the learning data. Alternatively, the model learning part 510-4 may, for example, train itself using a learning data without special supervision so that an artificial intelligence model may be trained through unsupervised learning discovering criteria for identifying an object. Further, the model learning part 510-4 may, for example, train an artificial intelligence model through reinforcement learning which uses a feedback as to whether a result of response provision according to learning is correct. In addition, the model learning part 510-4 may, for example, train an artificial intelligence model by using a learning algorithm including error back-propagation or gradient descent.

In addition, the model learning part 510-4 may learn criteria of selection as to what learning data is to be used to identify an object using an input data.

The model learning part 510-4 may, when a plurality of pre-constructed artificial intelligence models are present, identify an artificial intelligence model with high relevancy between input learning data and basic learning data as a data recognition model to train. In this case, the basic learning data may be pre-classified according to the type of data, and the artificial intelligence model may be pre-constructed according to the type of data.

When the artificial intelligence model is trained, the model learning part 510-4 may store the trained artificial intelligence model. In this case, the model learning part 510-4 may store the trained artificial intelligence model in a memory of the another electronic apparatus 500. Alternatively, the model learning part 510-4 may store the trained artificial intelligence model in a server connected to the another electronic apparatus 500 via a wired or wireless network or in a memory of an electronic apparatus.

The data learning part 510 may further include a learning data preprocessing part 510-2 and a learning data selection part 510-3 to improve a response result of an artificial intelligence model or to save time or resources necessary for generating an artificial intelligence model.

The learning data preprocessing part 510-2 may preprocess the acquired data so that the acquired data is utilized in learning to identify an object from an image. That is, the learning data preprocessing part 510-2 may process the acquired data to a predetermined format. For example, the learning data preprocessing part 510-2 may divide a sample image into a plurality of areas.

The learning data selection part 510-3 may select data necessary for learning from among the data acquired by the learning data acquisition part 510-1 and the data preprocessed by the learning data preprocessing part 510-2. The selected learning data may be provided to the model learning part 510-4. The learning data selection part 510-3 may select learning data necessary for learning from among the acquired or processed data according to predetermined selection criteria. In addition, the learning data selection part 510-3 may select learning data according to predetermined selection criteria by learning of the model learning part 510-4.

The learning part 510 may further include a model evaluation part 510-5 to improve a response result of the artificial intelligence model.

The model evaluation part 510-5 may input evaluation data to the artificial intelligence model, and if the response result output from the evaluation data does not satisfy predetermined criteria, allow the model learning part 510-4 to train again. In this case, the evaluation data may be a predefined data to evaluate the artificial intelligence model.

On the other hand, when there are a plurality of trained artificial intelligence models, the model evaluation part 510-5 may evaluate whether each of the trained artificial intelligence models satisfies the predetermined criteria and determine the model which satisfies the predetermined criteria as the final artificial intelligence model. In this case, when there are a plurality of models satisfying the predetermined criteria, the model evaluation part 510-5 may determine any one or a predetermined number of models previously set in descending order of the evaluation score as the final artificial intelligence model.

Figure 7:
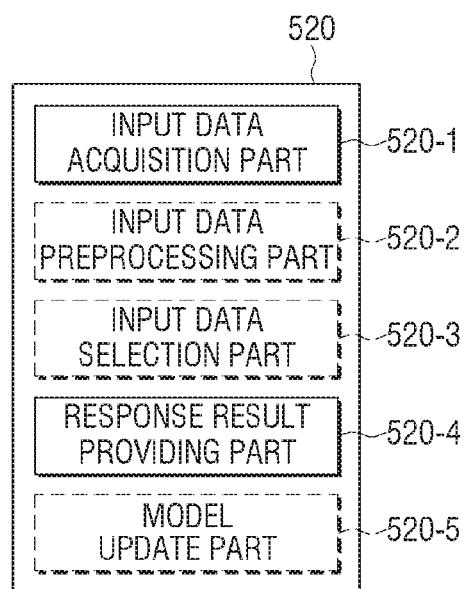
FIG. 7 is a block diagram illustrating a response part, according to an embodiment.

FIG. 7 is a block diagram illustrating the response part 520, according to an embodiment.

Referring to FIG. 7, the response part 520 according to one or more embodiments may include an input data acquisition part 520-1 and a response result providing part 520-4.

Further, the response part 520 may further selectively include at least one of an input data preprocessing part 520-2, an input data selection part 520-3, or a model update part 520-5.

The input data acquisition part 520-1 may acquire a data necessary for identifying an object. The response result providing part 520-4 may apply an input data acquired by the input data acquisition part 520-1 to the trained artificial intelligence model as an input value, and identify an object from an image. The response result providing part 520-4 may apply a data selected by the input data preprocessing part 520-2 or by the input data selection part 520-3 which will be described later, to the artificial intelligence model as an input value, and acquire the response result. The response result may be determined by the artificial intelligence model.

According to an embodiment, the response result providing part 520-4 may apply an artificial intelligence model identifying the object acquired by the input data acquisition part 520-1, and identify an object from an image.

The response part 520 may further include an input data preprocessing part 520-2 and an input data selection part 520-3 to improve a response result of an artificial intelligence model or to save time or resources necessary for providing the response result.

The input data preprocessing part 520-2 may preprocess data acquired to identify an object so that the acquired data may be used. That is, the input data preprocessing part 520-2 may process the acquired data to a predefined format.

The input data selection part 520-3 may select a data necessary for providing a response from among a data acquired by the input data acquisition part 520-1 or a data preprocessed by the input data preprocessing part 520-2. The selected data may be provided to the response result providing part 520-4. The input data selection part 520-3 may select some or all of the acquired or preprocessed data according to predetermined selection criteria for providing a response. In addition, the input data selection part 520-3 may select a data according to predetermined selection criteria by training of the model learning part 510-4.

The model update part 520-5 may control an artificial intelligence model to be updated based on an evaluation of a response result provided by the response result providing part 520-4. For example, the model update part 520-5 may provide a response result provided by the response result providing part 520-4 to the model learning part 510-4, and thereby request the model learning part 510-4 may further train or update the artificial intelligence model.

Figure 8:
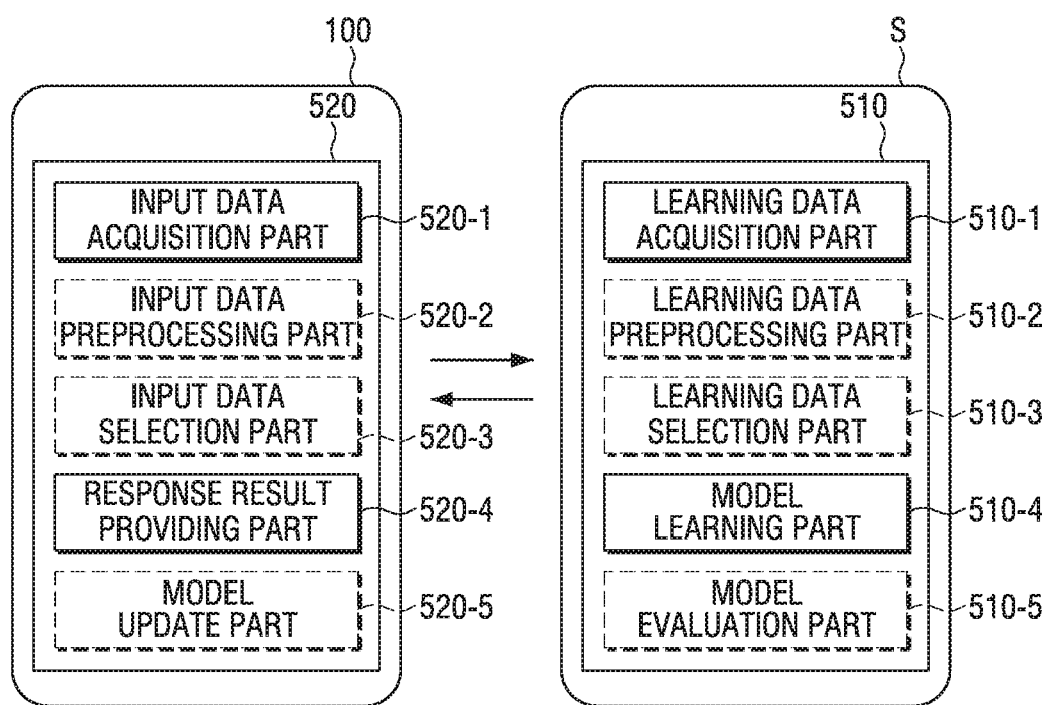
FIG. 8 is a diagram illustrating an example in which an electronic apparatus and an external server are interlocked with each other to learn and identify data, according to an embodiment.

FIG. 8 is a diagram illustrating an example in which an electronic apparatus 100 and an external server S are interlocked with each other to learn and identify data, according to an embodiment.

Referring to FIG. 8, the external server S may learn criteria for identifying an object from an image, and the electronic apparatus 100 may identify an object from an image based on a learning result of the server S.

In this case, a model learning part 510-4 of the server S may perform a function of the learning part 510 illustrated in FIG. 6. That is, the model learning part 510-4 of the server S may learn criteria as to which image information is to be used to identify an object and as to how the object is to be identified using the information described above.

Further, the response result providing part 520-4 of the electronic apparatus 100 may apply a data selected by the input data selection part 520-3 to an artificial intelligence model provided by the server S, and identify the object from the image. Alternatively, the response result providing part 520-4 of the electronic apparatus 100 may acquire the artificial intelligence model provided by the server S from the server S, and identify the object from the image.

Figure 9:
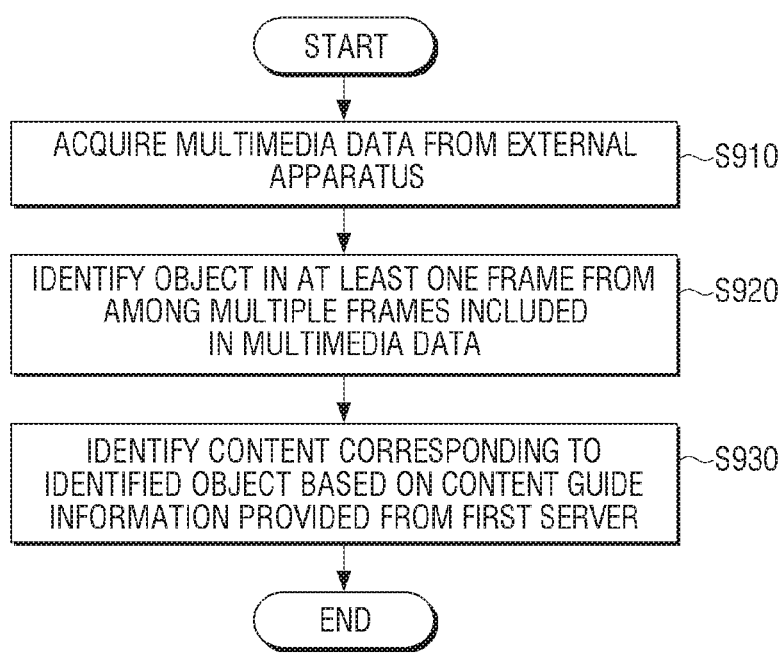
FIG. 9 is a flowchart illustrating a control method of an electronic apparatus, according to an embodiment.

FIG. 9 is a flowchart illustrating a control method of an electronic apparatus, according to an embodiment.

First, a multimedia data may be acquired from an external apparatus, at operation S910. Further, an object may be identified in at least one frame from among a plurality of frames included in the multimedia data, at operation S920. Further, a content corresponding to the identified object may be identified based on content guide information provided from a first server, at operation S930.

According to an embodiment, when no content is identified, an operation of acquiring a fingerprint based on at least one frame, an operation of transmitting the acquired fingerprint to a second server and an operation of acquiring content information corresponding to the fingerprint from the second server may be further included.

Further, the operation of acquiring the fingerprint may include, when no content is identified, identifying a type of external apparatus, and when the type of external apparatus is a predetermined type, acquiring a fingerprint based on at least one frame.

Meanwhile, the operation of transmitting at least one of the identified object or the identified content to the third server 400-3, and the operation of acquiring an advertisement corresponding to at least one of the identified object or the identified content from the third server 400-3 may be further included.

Further, the operation of identifying the object, S920, may include identifying the object in at least one frame based on an object recognition model, and the object recognition model may be acquired by training a plurality of sample images and a plurality of objects included in the plurality of sample images through an artificial intelligence algorithm.

In an embodiment, an operation of retraining the object recognition model based on information on the object and the content.

Meanwhile, the operation of identifying the object, S920, may include applying an optical character reader (OCR) to at least one frame from among a plurality of frames and identify a text. The operation of identifying the content, S930, may include identifying the content based on the identified text.

Further, an operation of identifying a type of external apparatus may be further included. The operation of identifying the object, S920, may include, when a type of external apparatus is a predetermined type, identifying an object in at least one frame.

Meanwhile, an operation of sequentially displaying a plurality of frames may be further included. The operation of identifying the object, S920, may include identifying an object in a displayed frame from among the plurality of frames.

Further, the object may include at least one of a title of content corresponding to at least one frame, a reproduction time of the content, channel information of the content, or a character included in at least one frame.

In accordance with one or more embodiments, an electronic apparatus may identify a content based on an object included in at least one frame from among a plurality of frames included in a multimedia data, thereby minimizing the use of an external server in content recognition.

Meanwhile, the one or more embodiments described above may be implemented as a S/W program including one or more instructions stored on machine-readable (e.g., computer-readable) storage media. The machine may be an apparatus which is capable of calling a stored instruction from the storage medium and operating according to the called instruction, and may include an electronic apparatus (e.g., an electronic apparatus 100) according to the above-described embodiments. When the one or more instructions are executed by a processor, the processor may perform a function corresponding to the one or more instructions directly or using other components under the control of the processor. The one or more instructions may include a code which is generated or executed by a compiler or an interpreter. The machine-readable storage media may be provided as non-transitory storage media. Herein, the term "non-transitory" only denotes that a storage medium does not include a signal but is tangible, which does not distinguish a case where data is semi-permanently stored in a storage medium from a case where data is temporarily stored in a storage medium.

According to an embodiment, the method according to the one or more embodiments described above may be provided as being included in a computer program product. The computer program product may be traded between a seller and a consumer as a product. The computer program product may be distributed online in the form of machine-readable storage media (e.g., compact disc read only memory (CD-ROM)) or through an application store (e.g., Play Store™). As for online distribution, at least a part of the computer program product may be at least temporarily stored in a server of a manufacturer, a server of an application store, or a storage medium such as memory, or may be temporarily generated.

The one or more embodiments described above may be embodied in a recording medium that may be read by a computer or a similar device to the computer by using software, hardware, or a combination thereof. In some cases, embodiments described herein may be implemented by processor itself. In a software configuration, one or more embodiments described in the specification such as a procedure and a function may be embodied as separate software modules. Each of the software modules may perform one or more functions and operations described in the specification.

Meanwhile, computer instructions for carrying out processing operations of machine according to the one or more embodiments described above may be stored in non-transitory computer-readable media. Computer instructions stored on such non-transitory computer-readable media may, when executed by a processor or of a specific device, cause the specific device to perform processing operations in the machine according to the various example embodiments described above. The non-transitory computer readable medium is not limited to a medium that permanently stores data therein, e.g., a register, a cache, a memory, or the like, but can be a medium that semi-permanently stores data therein and is readable by a device. For example, the non-transitory computer readable medium may include a compact disc (CD), a digital versatile disc (DVD), a hard disc, a Blu-ray disc, a memory card, or a read only memory (ROM).

The respective components (e.g., module or program) according to the one or more embodiments may include a single entity or a plurality of entities, and some of the corresponding sub components described above may be omitted, or another sub component may be further added to the one or more embodiments. Alternatively or additionally, some elements (for example, modules or programs) may be integrated into one entity, and a function performed by the respective elements before integration may be performed in the same or similar manner. The module, a program, or operations executed by other elements according to one or more embodiments may be executed consecutively, in parallel, repeatedly, or heuristically, or at least some operations may be executed according to a different order, may be omitted, or the other operation may be added thereto.

The foregoing embodiments and advantages are merely examples and are not to be construed as limiting the disclosure. The present teaching may be readily applied to other types of devices. Also, the description of the one or more embodiments is intended to be illustrative, and not to limit the scope of the claims, and many alternatives, modifications, and variations will be apparent to those skilled in the art.

What is claimed is:

1. An electronic apparatus, comprising:
a communicator comprising circuitry; and
a processor configured to:
obtain multimedia data from an external apparatus via the communicator;
identify an object in at least one frame from among a plurality of frames included in the multimedia data;
compare the identified object with an electronic program guide (EPG) provided from a first server; and
identify a content corresponding to the identified object based on comparing the identified object with the EPG provided from the first server without acquiring a fingerprint corresponding to the at least one frame.

2. The electronic apparatus as claimed in claim 1, wherein the processor is further configured to:
control the communicator to transmit either one or both of the identified object and the identified content to a third server; and
obtain an advertisement corresponding to either one or both of the identified object and the identified content from the third server via the communicator.

3. The electronic apparatus as claimed in claim 1, further comprising:
a storage,
wherein the processor is further configured to:
identify the object in the at least one frame based on an object recognition model stored in the storage,
wherein the object recognition model is obtained by training a plurality of sample images and a plurality of objects included in the plurality of sample images through an artificial intelligence algorithm.

4. The electronic apparatus as claimed in claim 3, wherein the processor is further configured to retrain the object recognition model based on information relating to the object and the content.

5. The electronic apparatus as claimed in claim 1, wherein the processor is further configured to:
apply an optical character reader (OCR) to the at least one frame, from among the plurality of frames, and identify a text;
compare the identified text with the EPG; and
identify the content based on comparing the identified text with the EPG.

6. The electronic apparatus as claimed in claim 1, wherein the processor is further configured to:
identify a type of the external apparatus; and
based on the type of the external apparatus being a predetermined type, identify the object in the at least one frame.

7. The electronic apparatus as claimed in claim 1, further comprising:
a display,
wherein the processor is further configured to:
control the display to sequentially display the plurality of frames; and
identify the object in a displayed frame from among the plurality of frames.

8. The electronic apparatus as claimed in claim 1, wherein the object comprises any one or any combination of a title of a content corresponding to the at least one frame, a reproduction time of the content, channel information of the content, and a character included in the at least one frame.

9. A control method of an electronic apparatus, the control method comprising:
- obtaining multimedia data from an external apparatus;
- identifying an object in at least one frame from among a plurality of frames included in the multimedia data;
- comparing the identified object with an electronic program guide (EPG) provided from a first server; and
- identifying a content corresponding to the identified object based on comparing the identified object with the EPG provided from the first server without acquiring a fingerprint corresponding to the at least one frame.

10. The control method as claimed in claim 9, further comprising:
- transmitting either one or both of the identified object or the identified content to a third server; and
- obtaining an advertisement corresponding to either one or both of the identified object or the identified content from the third server.

11. The control method as claimed in claim 9, wherein the identifying the object comprises:
- identifying the object in the at least one frame based on an object recognition model, and
- wherein the object recognition model is obtained by training a plurality of sample images and a plurality of objects included in the plurality of sample images through an artificial intelligence algorithm.

12. The control method as claimed in claim 11, further comprising:
- retraining the object recognition model based on information relating to the object and the content.

13. The control method as claimed in claim 9, wherein the identifying the object comprises:
- applying an optical character reader (OCR) to the at least one frame from among the plurality of frames, and identifying a text,
- comparing the identified text with the EPG, and
- identifying the content based on comparing the identified text with the EPG.

14. The control method as claimed in claim 9, further comprising:
- identifying a type of the external apparatus,
- wherein the identifying the object comprises, based on the type of the external apparatus being a predetermined type, identifying the object in the at least one frame.

15. The control method as claimed in claim 9, further comprising:
- sequentially displaying the plurality of frames,
- wherein the identifying the object comprises identifying the object in a displayed frame, from among the plurality of frames.

16. The control method as claimed in claim 9, wherein the object comprises any one or any combination of a title of a content corresponding to the at least one frame, a reproduction time of the content, channel information of the content, and a character included in the at least one frame.

17. The electronic apparatus as claimed in claim 1, wherein the identified object is one of an image depicting an item displayed when the at least one frame is displayed or textual information displayed when the at least one frame is displayed.

18. The electronic apparatus as claimed in claim 1, wherein the identified object is an image depicting an item displayed when the at least one frame is displayed.

19. The electronic apparatus as claimed in claim 1, wherein the identified object is textual information displayed when the at least one frame is displayed.

* * * * *